United States Patent [19]
Gieseler et al.

[11] Patent Number: 5,780,732
[45] Date of Patent: Jul. 14, 1998

[54] METHOD FOR THE VERIFICATION OF ELECTRICAL CONNECTIONS FOR AN ANTILOCK BRAKING SYSTEM OF A VEHICLE

[75] Inventors: Axel Gieseler, Hanover; Klaus Lindemann, Gehrden; Johannes Möller, Lehrte/Arpke; Henrich Riedemann, Hanover; Gerhard Ruhnau, Neustadt; Manfred Saba, Ronnenberg; Ulrich Weihe, Hanover, all of Germany

[73] Assignee: Wabco Vermogensverwaltungs GmbH, Hanover, Germany

[21] Appl. No.: 850,447

[22] Filed: May 5, 1997

Related U.S. Application Data

[63] Continuation of Ser. No. 520,156, Aug. 28, 1995, abandoned.

[30] Foreign Application Priority Data

Aug. 30, 1994 [DE] Germany ............... 44 30 782.9

[51] Int. Cl.⁶ ............................................. G01L 5/28
[52] U.S. Cl. ............................................. 73/121
[58] Field of Search ...................... 73/121, 123, 129

[56] References Cited

U.S. PATENT DOCUMENTS

| | | |
|---|---|---|
| 3,872,720 | 3/1975 | Fleagle et al. |
| 4,192,180 | 3/1980 | Gerstenmeier et al. ............ 73/121 |
| 4,805,447 | 2/1989 | Meguro et al. ............... 73/121 |
| 4,912,969 | 4/1990 | Ishizeki ........................ 73/121 |
| 5,327,781 | 7/1994 | Moran et al. ................. 73/121 |

FOREIGN PATENT DOCUMENTS

| | | |
|---|---|---|
| A-34 15 193 | 12/1985 | Germany. |
| 38 30 278 C2 | 6/1991 | Germany. |
| A-40 05 299 | 8/1991 | Germany. |
| 39 03 071 C2 | 9/1994 | Germany. |
| 4058134 | 2/1992 | Japan ............................ 73/123 |
| 6265443 | 9/1994 | Japan ............................ 73/121 |

OTHER PUBLICATIONS

"Antilock Brake Systems (ABS) for Commerical Vehicles", WABCO Westinghouse Fahrzeugbremsen, 1991.

*Primary Examiner*—Robert Raevis
*Attorney, Agent, or Firm*—Meltzer, Lippe, Goldstein et al.

[57] ABSTRACT

A process for the verification of an antilock braking system (ABS) in a vehicle to check for correct connection of the component wheel sensors (3, 4, 17, 18, 19, 20), braking pressure modulators (7, 9, 12), and brake cylinders (5, 6, 10, 11, 13, 14) is proposed. The method can be used in a new installation of the ABS or when resuming operation after repair of the system. In a first step, the user causes a single sensed wheel to rotate. This actuates a testing mode in the ABS electronic controller (8). The electronic controller (8) then actuates the modulator belonging to the rotated wheel. From the response of the sensed wheel and/or the actuated modulator, the user recognizes whether the matching between the sensor of the rotated wheel and the actuated modulator is correct. This procedure is then repeated with the other sensed wheels.

19 Claims, 2 Drawing Sheets

METHOD FOR THE VERIFICATION OF ELECTRICAL CONNECTIONS FOR AN ANTILOCK BRAKING SYSTEM OF A VEHICLE

This is a continuation of application Ser. No. 08/520,156, filed Aug. 28, 1995, now abandoned.

FIELD OF THE INVENTION

The present invention relates to antilock brake systems (ABS) for vehicles. More particularly, the present invention relates to a method for verifying the connections among components of an ABS in a vehicle either upon initial installation or after repair. Such an ABS is normally configured with an electronic system containing a suitably programmed microcomputer.

BACKGROUND OF THE INVENTION

Verification of the connections among components of an antilock braking system is advisable following installation in the vehicle or after resumption of operation following repairs. The installation or resumption of operation may take place either at the vehicle manufacturer's facility or in a repair shop.

A typical error that may occur in the installation of the antilock braking system is the mismatching of the connections of the wheel speed sensors or the brake pressure modulators. This mismatched connection may cause actuation not of the appertaining modulator of the locked wheel, but of the modulator of another wheel. Such errors incapacitate the antilock braking system. Another error occurs if a modulator or sensor has not been connected at all. The electronic system itself may not recognize such an error under certain conditions.

Different diagnostic instruments are known to read an error from the error memory of the electronic system. These diagnostic instruments also perform active verification of the antilock braking system, including the wiring (see WABCO published document "Antilock Brake Systems (ABS) for Commercial Vehicles," chaps. 5–6, 1992). According to this document, the type of the installed system, i.e., the number of wheel sensors and modulators, can be displayed by means of a flashing or blinking code. With the same code, the content of the error memory can be read out.

Direct display of the error number with an error code display is more convenient. Even more convenient is the examination of the antilock braking system by means of a special diagnostic controller.

Often however, special testing equipment is not available, or qualified personnel to service the instruments are not available. Also, it is not always possible to check out completely the entire control circuit that consists of sensor, electronic controller, modulator and brake cylinder by means of the known testing instruments. It is also difficult to recognize a mechanical defect on the modulator which could lead to faulty actuation of the brake cylinder.

SUMMARY OF THE INVENTION

It is the object of the present invention to provide a method for simple and comprehensive verification of an antilock braking system installation in a vehicle without any special verification instruments and that can be carried out by personnel with little training.

The method of the present invention includes several steps to verify the connections among the wheel sensors, pressure modulators, and brake cylinders of the ABS. The method can be used in a new installation of the ABS or when resuming operation after repair of the system. In a first step, the user causes a sensed wheel to rotate. This actuates a testing mode in the ABS electronic system. The ABS electronic system then actuates the modulator belonging to the rotated wheel. From this the user recognizes whether the connection between the sensor of the rotated wheel and the actuated modulator is correct. This procedure is then repeated with the other sensed wheels.

DETAILED DESCRIPTION OF THE INVENTION

Figure 1:
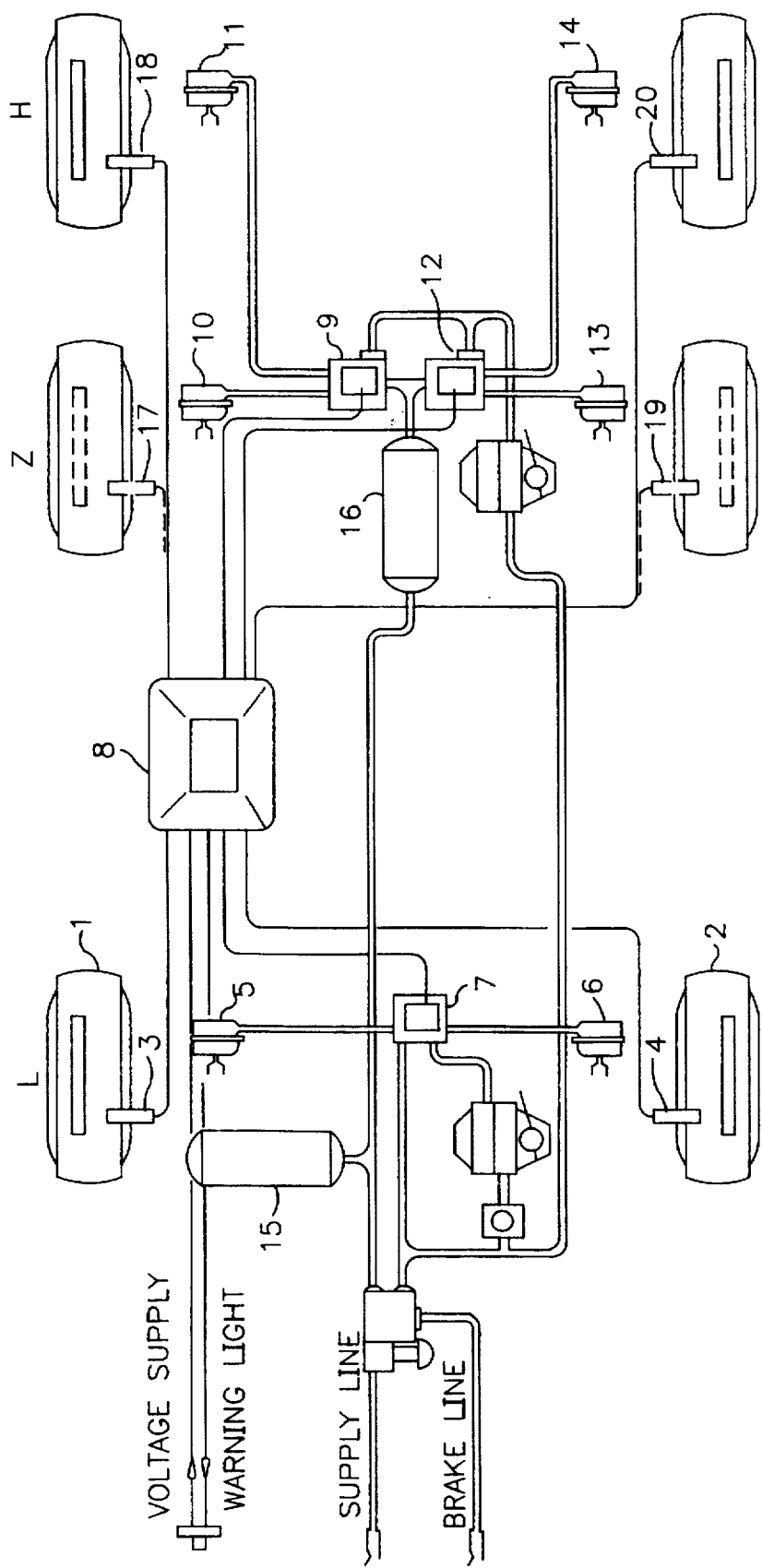
FIG. 1 shows a trailer with three axles and an antilock braking system.

FIG. 1 shows an antilock braking system for a trailer as an example of the preferred embodiment. The tractor (not shown) provides the following connections: a voltage supply for an ABS electronic controller (8), a connection for a warning lamp in the tractor to be actuated by the electronic controller (8), a pneumatic connection of the pressure supply line as well as additional pneumatic connections for the brake line. Braking is effected by means of compressed air which is stored in reservoirs (15, 16). The trailer has three axles, i.e., a steering axle (L), an intermediate axle (Z) and a rear axle (H). The two wheels (1, 2) of the steering axle (L) are sensed, i.e., they are equipped with toothed rings as well as with wheel speed sensors (3, 4). The wheels of the intermediate axle (Z) are not sensed but can be equipped with sensors (17, 19) (indicated by broken lines). The wheels of the rear axle (H) are sensed with sensors (18, 20). All wheel speed sensors are connected to the ABS electronic controller (8) via connecting lines of different lengths.

The wheels of the steering axle (L) are braked by means of the brake cylinders (5, 6). Air supply to the mentioned brake cylinders is controlled via a common modulator (7) (such as a control valve). The latter is connected by a line to the electronic controller (8).

To control the two front wheels (1, 2) of the trailer, only one common modulator (7) is provided. From this it is possible to recognize that control is not by individual regulation (IR) but operates in accordance with the select low (SL) principle. According to this mode of operation, if one side of the road is slippery and a wheel on that side of road becomes ABS-regulated during emergency braking of the vehicle prior to the wheel travelling on the other less slippery side of the road, then the same lowered braking pressure applied to the "low" wheel is applied to the "high" wheel. Similarly, one common modulator (9, 12) is provided for each side of the vehicle for the wheels of the intermediate axle (Z) and of the rear axle (H). The control is effected again according to a select-low principle per side using the modulator (9) for the brake cylinders (10, 11) and the modulator (12) for the brake cylinders (13, 14). This applies in case the wheels of the intermediate axle, as well as of the rear axle, are sensed. The two modulators (9, 12) are in turn connected electrically to the ABS electronic controller (8), or are actuated by the latter.

To verify the connections of the antilock braking system according to the method of the present invention, a sensed wheel must first be rotated after the installation of the ABS. For this purpose the wheel must either be jacked up by means of a car jack so that it can rotate freely, or the vehicle, in this case the trailer, must be driven with the wheel to be rotated on a roller testing station. The user then causes the rotatable wheel to rotate, preferably to a wheel rotation rate corresponding to a vehicle speed of between 4 and 15 km/h. Following this, the wheel is braked. This causes the ABS electronic controller (8), prompted by a particular program subroutine, to issue an actuation signal to the modulator, associated with the wheel that was rotated. The user recognizes whether the connection between the sensor of the rotated wheel to the actuated modulator is correct, i.e., whether the actuated modulator belongs to the rotated wheel. The user recognizes this either from the sound of the actuated modulator or, if the trailer is supplied with compressed air, from the actuation of the corresponding brake cylinder and the resulting braking of the previously rotated wheel. When the described procedure has been repeated for the other sensed wheels, the user is able to ascertain whether all modulators and sensors are paired correctly.

Figure 2:
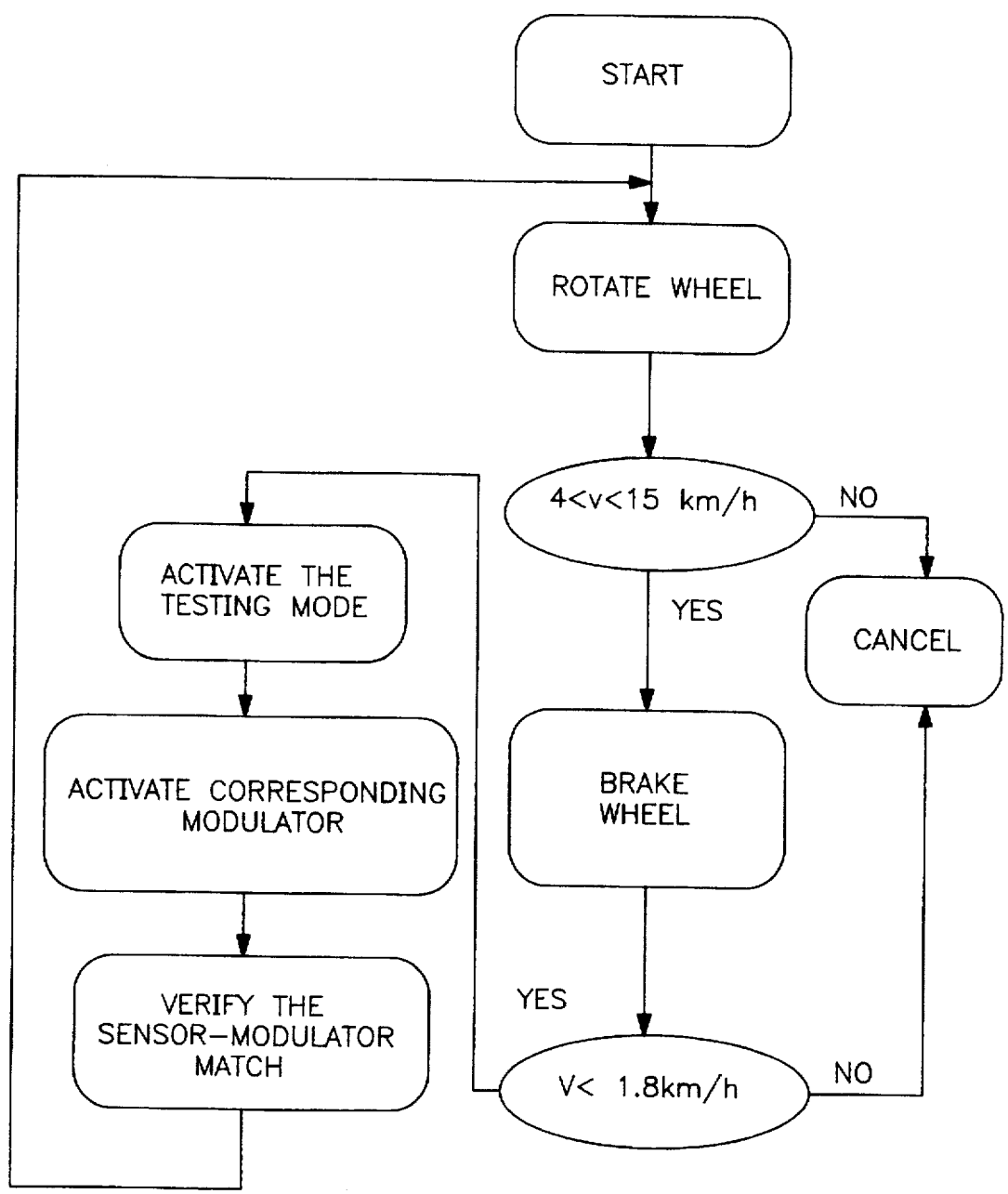
FIG. 2 shows a flow diagram of the process according to the invention.

A corresponding flow diagram which is followed in the microcomputer of the ABS electronic controller (8) is shown in FIG. 2. The electronic controller (8) may also be switched into the testing mode by the user by means of an external signal (excitation) to carry out the testing procedure. Suitable wiring of the connection strip of the electronic system must be provided for this feature.

If the vehicle is not supplied with compressed air, the wheel is stopped manually or by means of the roller testing station after rotation. The wheel speed is preferably slowed to less than approximately 1.8 km/h, thereby causing the electronic controller (8) to actuate the testing mode.

The electronic controller (8) can also be programmed to differentiate among the different axles (rear axle (H), intermediate axle (Z) and steering axle (L)), so that the appertaining modulators can be actuated in different manners. This means that the brake pressure can be increased, decreased or changed in pulses in accordance with a prescribed pattern. The user is thus able to recognize whether connections of different axles may have been mismatched.

The method according to the present invention can also be modified without departing from the spirit of the invention. Thus, for example, it may be designated that the modulator across from the sensed, rotated wheel is actuated by the electronic controller (8). It is also possible for the electronic controller (8) to indicate the number of the wheel after it has been rotated, e.g., by means of a flashing code. The user then disconnects the appertaining modulator and the electronic controller recognizes this and emits once more the same number if the sensor and the modulator are connected together. If this is not the case, then the two numbers would be different so that the user recognizes an error (e.g., a wrong modulator).

When a tractor engine with ABS is checked on a roller testing station, it is preferable to first give a signal to the driver or user inviting him to actuate the brake. This causes the rotated wheel to be braked. The electronic controller (8) then actuates only the appertaining modulator. This ABS actuation causes the brake cylinder of this wheel to be vented so that the wheel becomes rotatable again. In this manner the correct association between sensor, modulator, brake and wheel is especially easy to check.

In a motor vehicle with automatic slip control (ASR), the rear axle pressure for the braking of the appertaining wheel can be controlled without the driver automatically via the ASR valves. In any case the user is able, thanks to the described testing method, to check the installation of the antilock braking system for mismatched wiring without any additional expensive testing devices.

While the present invention has been described by reference to a specific embodiment, this was for purposes of illustration only. Numerous alternative embodiments will be apparent to those skilled in the art and are considered to be within the scope of the present invention.

We claim:

1. A method for verifying correct connections among components of an antilock braking system (ABS) in a vehicle, said antilock braking system comprising a plurality of wheels, sensors associated with said wheels, brake pressure modulators associated with said wheels, and an ABS electronic controller to which said sensors and modulators are connected, said method comprising the steps of:
   a) rotating only one of said sensed wheels and subsequently stopping rotation of said sensed wheel,
   b) initiating a test mode in said ABS electronic controller,
   c) emitting an actuation signal from said ABS electronic controller to a modulator associated with said sensed wheel,
   d) determining from the response of said sensed wheel or said actuated modulator whether said actuated modulator is connected to said sensed wheel which has been rotated.

2. Method as in claim 1, wherein said sensed wheel is rotated up to a predetermined wheel speed.

3. Method as in claim 2, wherein said wheel speed is between 4 and 15 km/h.

4. Method as in claim 1, wherein said test mode is initiated only after said sensed wheel has slowed to a wheel speed which is less than 1.8 km/h.

5. Method as in claim 1, wherein, in order to differentiate between a rear axle, an intermediate axle and a steering axle, said modulators appertaining to said rear axle, said intermediate axle, and said steering axle are actuated in different manners by said ABS electronic controller.

6. Method as in claim 5, wherein said modulators are actuated in a pulsed manner.

7. Method as in claim 1, further comprising the steps of:
   displaying a number identifying said sensed rotated wheel with said ABS electronic controller,
   electrically disconnecting said appertaining modulator of said sensed rotated wheel, and
   redisplaying said number identifying, said sensed rotated wheel with said ABS electronic controller if the matching between said rotated sensed wheel and said modulator is correct.

8. Method as in claim 7, wherein said display is in the form of a flashing code.

9. Method as in claim 1 for the verification of a tractor engine with ABS on a roller testing station, further comprising the steps of:
   rotating said sensed wheel, and
   actuating a vehicle brake and said ABS electronic controller then actuates said modulator corresponding to said sensed wheel.

10. The method of claim 1, further comprising repeating steps (a), (b), (c), and (d) for each of said wheels and modulators.

11. Method for verifying correct connections among components of an antilock braking system (ABS) in a vehicle, said antilock braking system comprising a plurality of wheels, sensors associated with said wheels, brake pressure modulators associated with said wheels, and an ABS electronic controller to which said sensors and modulators are connected, said method comprising the steps of:

a) initiating a test mode in said ABS electronic controller by means of an external signal, b) subsequent to initiating said test mode, rotating only one of said sensed wheels and subsequently stopping rotation of said sensed wheel, c) transmitting an actuating signal from said ABS electronic controller to a modulator associated with said sensed wheel, d) determining from the response of said sensed wheel or said actuated modulator whether said actuated modulator is connected to said rotated sensed wheel.

12. Method as in claim 11, wherein said single sensed wheel is rotated until it reaches a rate of rotation which corresponds to a predetermined wheel speed.

13. Method as in claim 12, wherein said wheel speed is between 4 and 15 km/h.

14. Method as in claim 11, wherein, in order to differentiate between a rear axle, an intermediate axle and a steering axle, said modulators appertaining to said rear axle, said intermediate axle and said steering axle are actuated in different manners by said ABS electronic controller.

15. Method as in claim 14, wherein said modulators are actuated in a pulsed manner.

16. Method as in claim 11, further comprising the steps of:

displaying a number identifying said sensed wheel with said ABS electronic controller, electrically disconnecting said appertaining modulator of said sensed wheel, and redisplaying said number identifying said sensed rotated wheel with said ABS electronic controller if the matching between said sensed rotated wheel and said modulator is intact.

17. Method as in claim 16, wherein said display is in the form of a flashing code.

18. Method as in claim 11 for the verification of a tractor engine with ABS on a roller testing station, further comprising the steps of:

rotating said sensed wheel, and stopping said sensed wheel by actuating a brake associated with said sensed rotated wheel, wherein said ABS electronic controller then actuates said modulator connected to said sensed rotated wheel.

19. Method as in claim 11, further comprising repeating steps (a), (b), (c), and (d) for each of said wheels and modulators.

* * * * *